United States Patent
Krauss

(10) Patent No.: US 6,194,018 B1
(45) Date of Patent: Feb. 27, 2001

(54) METHOD OF PRODUCING A CHOCOLATE HOLLOW BODY

(75) Inventor: Willi Krauss, Muellheim (DE)

(73) Assignees: Innogram AG, Basel (CH); Futurplan AG, Vaduz (LI); Willie Vaduz, Muellheim (DE)

( * ) Notice: Subject to any disclaimer, the term of this patent is extended or adjusted under 35 U.S.C. 154(b) by 0 days.

(21) Appl. No.: 09/319,929
(22) PCT Filed: Dec. 3, 1997
(86) PCT No.: PCT/EP97/06768
  § 371 Date: Aug. 20, 1999
  § 102(e) Date: Aug. 20, 1999
(87) PCT Pub. No.: WO98/26668
  PCT Pub. Date: Jun. 25, 1998

(30) Foreign Application Priority Data

Dec. 17, 1996 (DE) ............................... 196 52 575

(51) Int. Cl.$^7$ ........................................... A23G 1/00
(52) U.S. Cl. ............................... 426/515; 426/660
(58) Field of Search .................... 426/512, 515, 426/660

(56) References Cited

U.S. PATENT DOCUMENTS 3,666,388 * 5/1972 Oberwelland et al. ............... 426/515
5,409,722 * 4/1995 Binley .................................. 426/660

* cited by examiner

*Primary Examiner*—George C. Yeung
(74) *Attorney, Agent, or Firm*—Oblon, Spivak, McClelland, Maier & Neustadt, P.C.

(57) ABSTRACT

A method of producing a hollow body of chocolate material having at least one first chamber and at least one second chamber separated by a common partition wall, including filling a dosed amount of chocolate material into a first mould component of a hollow mould which includes the first mould component and at least one second mould component, sealing the first mould component with a cover and spinning the first mould component until a hollow subbody having the at least one first chamber and a wall defined along the cover is formed in the first mould component, removing the cover, and spinning the at least one second mould component placed on top of the wall filled with a dosed amount of the chocolate material until a second hollow subbody with the at least one second chamber and the common partition wall has formed on the first hollow subbody.

15 Claims, 1 Drawing Sheet

METHOD OF PRODUCING A CHOCOLATE HOLLOW BODY

DESCRIPTION

Figure 1:
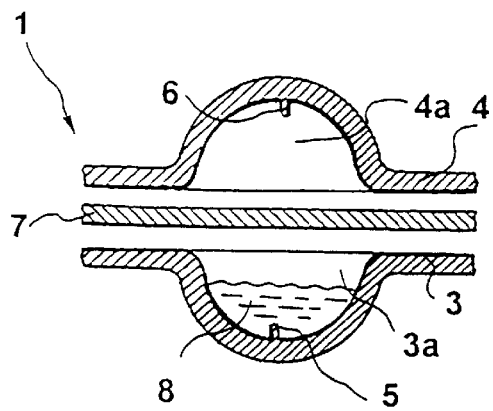

The present invention refers to a method of producing a hollow body of chocolate material.

There are known many methods for producing hollow bodies of chocolate material. For instance, GB-A-2 279 286 shows a method of producing two hollow chocolate bodies which with a respective one of their surfaces can be placed one upon the other and are to be jointly packed and sold in this condition. The surface with which the two hollow bodies are placed one on top of the other is provided with a profile which is formed to be positive on one hollow body and negative on the other hollow body to achieve a surprising effect when the hollow bodies are separated. Such a profile is formed by a profiled mould wall which is inserted between two hollow moulds and remains there until the two hollow bodies are finished.

Furthermore, hollow chocolate bodies, in particular chocolate bodies of the kind which are filled later on, are produced e.g. in accordance with a method of the type described in connection with chocolate sweets in German-Offenlegungsschrift 34 47 245. This method comprises the steps of producing first a semispherical cup from chocolate material, filling said cup and closing it finally by means of a cover. Multi-chamber hollow bodies cannot be produced with the aid of this method.

Hollow bodies which are adapted to be filled can, for example, also be produced by means of divided hollow moulds according to the method described in German-Offenlegungsschrift 42 13 293; in the case of said method, a filling hole is formed in the hollow body through which the filling can subsequently be introduced in said hollow body. Multi-chamber hollow bodies cannot be produced by means of this method either.

In addition, it is known e.g. from German-Offenlegungsschrift 38 12 805 that, in the production of hollow chocolate bodies, a second mould may used as a cover.

German-pat. 44 21 706 describes a hollow chocolate body whose production process includes the step of inserting a waffle layer in the mould, said waffle layer being coated with chocolate when the hollow body is being produced, whereby it is protected against softening by a filling introduced in said hollow body.

Hence, it is the object of the present invention to provide a method by means of which multi-chamber hollow chocolate bodies can be produced in a simple and economy-priced manner.

This object is achieved by the method disclosed in claim 1.

On the basis of the embodiment according to the present invention, the respective hollow subbodies enclosing each a chamber are formed directly one on top of the other; the embodiment according to the present invention permits the use of one of the conventional, divided hollow moulds which are normally used for producing undivided hollow bodies enclosing only one chamber.

On the basis of the embodiment according to claim 2, the cover can be held in place in a simple manner even if it is very thin.

The chambers are filled in an advantageous manner in accordance with claim 3 through filling holes formed in the hollow subbodies.

The hollow chocolate bodies produced by means of the method according to the present invention are particularly suitable for liquid fillings according to claim 4, since the chambers do not leak due to the fact that they are produced essentially in one piece.

The fact that the chambers are produced in one piece also prevents different fillings provided for each of said chambers according to claim 5 from intermixing before the chocolate sweet is eaten, whereby the taste sensation would be impaired.

For forming a partition, it will fully suffice to provide according to claim 6 a thin foil as a cover, said thin foil having also the advantage that it will closely adhere to the edges of the mould component so that no liquid chocolate material can escape and the additional advantage that conventional divided hollow moulds can be sealed as usual, i.e. as in cases where a single-chamber hollow body is produced.

Claim 7 describes a hollow mould which is particularly suitable for carrying out the method according to the present invention.

The spherical hollow body described in claim 8 is particularly suitable to be produced by the method according to the present invention.

The method according to the present invention is particularly suitable for producing the chocolate sweets described in claims 9 and 10.

Figure 5:
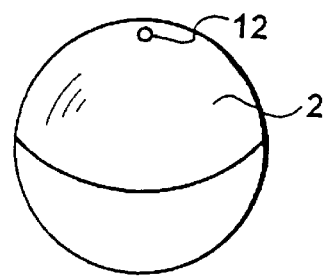

In the following, one embodiment of the present invention will be described in detail on the basis of the drawings, in which FIG. 1–4 show schematic sectional views of a divided hollow mould in the case of different stages of the method according to the present invention, FIG. 5 shows a perspective view of a chocolate sweet produced by means of the method according to the present invention.

FIG. 1 shows a hollow mould 1 which is normally accommodated in a tray together with a plurality of hollow moulds having the same shape so that a plurality of hollow bodies can be produced simultaneously. The hollow mould 1 is implemented such that spherical, bite-sized hollow chocolate bodies 2 (FIG. 5) can be produced and it comprises two essentially identical mould components 3 and 4 which each enclose a semispherical mould cavity 3a and 4a. A mandrel 5 and 6 projects into each of said cavities 3a, 4a, said mandrel projecting centrally from the respective semispherical cavity into the interior thereof and being used for forming filling holes.

The hollow mould 1 additionally comprises a cover 7 which is in any case large enough to cover the cavities 3a and 4a. Said cover 7 can be a thin plastic foil or also a thin metal sheet or the like, and its thickness is preferably such that conventional hollow moulds 1 can still be closed even if said cover 7 is positioned between the mould components 3 and 4.

The chocolate sweet 2 is produced by filling first a dosed amount of chocolate material 8 into one of the cavities, which is the cavity 3a of the mould component 3 in the case of the embodiment shown; said dosed amount of chocolate material 8 suffices to cover the walls of the mould component 3, which enclose said cavity 3a, and the part of the cover 7, which covers said cavity 3a, with a layer thickness guaranteeing a sufficient wall thickness for the chocolate sweet 2. Subsequently, the cover 7 is placed on top of the mould component 3 in such a way that it seals the cavity 3a.

The cover 7 is fixed by applying the mould component 4 whose cavity 4a is still empty for the time being.

Figure 2:
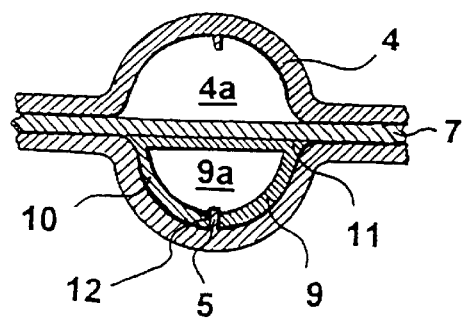
Figure 3:
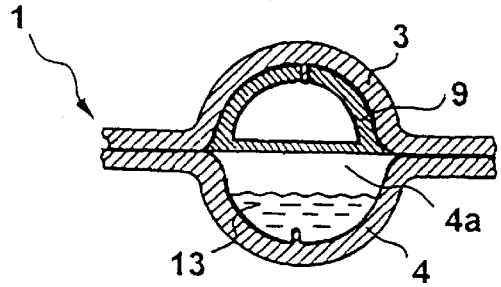
Figure 4:
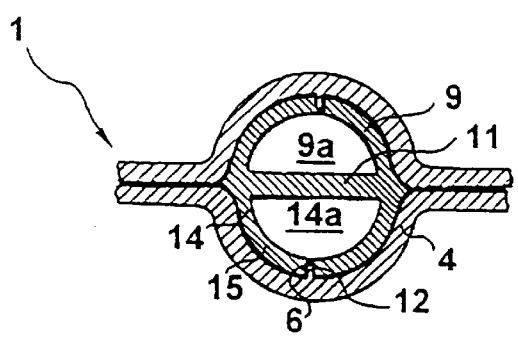

Subsequently, the hollow mould 1 is spun in the usual way by rotating it about different axes so that the liquid chocolate material 8 distributes in the cavity 3a along the walls thereof and forms, after having solidified, the semispherical hollow subbody 9, which is shown in FIG. 2 and which encloses a chamber 9a by a semispherical cup 10, defined by the walls of the cavity 3a, and by a straight wall 11 defined by the cover 7. Due to the pin 5, a filling hole 12 is additionally formed, said filling hole 12 extending through the semispherical cup 10 and permitting access so that the chamber 9a can be filled later on.

When the hollow subbody 9 has solidified, the mould is opened, the cover 7 is removed, the hollow mould 1 containing the hollow subbody 9 is rotated by 180°, also the cavity 4a of the second mould component 4 is filled with a dosed amount of liquid chocolate material 13 and the hollow mould 1 is closed. The straight wall 11 of the hollow subbody 9 now seals the cavity 4a of the second mould component 4.

Subsequently, the hollow mould 1 is spun in the usual way and cooled, whereby the chocolate material 13 distributes over the walls of the cavity 4a and the surface of the straight wall 11 in the manner which has already been described hereinbefore; this has the effect that, on the one hand, a small amount of the material of said wall 11 is melted and that, on the other hand, said wall 11 is reinforced again by the chocolate material 13 so that the second hollow subbody 14 forming in the cavity 4a is formed directly on the first hollow subbody 9. The wall 11 then forms a stable partition by means of which the two hollow subbodies are fixedly interconnected.

Also the second hollow subbody 14 is formed with a semispherical cup 15 enclosing a second chamber 14a, the pin 6 providing a further filling hole 12 through which also this chamber 14a can be filled.

When conventional hollow moulds are used, which offer the possibility of introducing a filling, the chocolate sweet 2 consisting of the two hollow subbodies 9 and 14 is subsequently filled through the filling holes 12; the chocolate sweet 2 produced in accordance with the present invention is particularly suitable for receiving therein two liquid fillings. The liquid fillings can be fillings of the type described in DE 195 44 795.6; the disclosure of said DE 195 44 795.6 is herewith included by making reference thereto. The filling that is to be introduced in the first chamber 9a contains sodium bicarbonate, and the second filling introduced in the second chamber contains an acid, preferably a fruit acid, such as citric acid. When the chocolate sweet, and especially the partition, is chewed, the two fillings come into contact with each other and react whereupon carbon dioxide is set free and a prickling characteristic taste is obtained. The sodium bicarbonate and the acid are preferably contained in the same basic mixture, e.g. a concentrate of champagne, whose characteristic taste matches the taste sensation caused by the gas that is set free.

Either the same chocolate material or different chocolate materials, such as e.g. milk chocolate or dark chocolate, can be used for the purpose of producing the hollow subbodies 9 and 14, respectively.

Modifying the embodiment which is described and shown in the figures, all conventional hollow moulds can be used, e.g. also hollow moulds in which only a predetermined breaking point is produced instead of the filling hole, and which include in their respective mould components a filling hole that can be used, on the one hand, for introducing the chocolate material into the cavities of the mould components and, on the other hand, also for introducing the filling into the chambers of the hollow subbodies later on. In this case, the rotation of the hollow mould shown in FIG. 3 may perhaps not be necessary.

Furthermore, hollow chocolate bodies of any desired shape and size can be produced by means of the method according to the present invention. Also asymmetric hollow bodies can be formed by means of asymmetric mould components. When a hollow mould consisting of more than two mould components is used, hollow bodies with three or even more than three chambers can be produced.

When a suitably stiff cover is used, which is capable of adhering to the mould component or which can be secured thereto in some other way, it will not be absolutely necessary to place the second, still empty mould component on top of the first mould component when the first hollow subbody is being produced.

The chocolate sweet produced by the method according to the present invention can, in addition, be provided with any desired filling.

What is claimed is:

1. A method of producing a hollow body of chocolate material having at least one first chamber and at least one second chamber separated by a common partition wall, said method comprising the steps of:
    filling a dosed amount of chocolate material into a first mould component of a hollow mould which includes the first mould component and at least one second mould component;
    sealing the first mould component with a cover and spinning the first mould component until a hollow subbody having the at least one first chamber and a wall defined along the cover is formed in said first mould component;
    removing the cover;
    filling the at least one second mould component with a dosed amount of the chocolate material;
    placing the at least one second mould component on said wall; and
    spinning the at least one second mould component until a second hollow subbody with the at least one second chamber and the common partition wall is formed on said first hollow subbody.

2. The method according to claim 1, wherein the at least one second mould component is applied to the cover in an empty condition before the first mould component is filled and spun.

3. The method according to claim 1 or 2, further comprising forming at least one filling hole in said first and second hollow subbodies, respectively, wherein said at least one hole is used to fill said at least one first chamber and said at least one second chamber, respectively.

4. The method according to claim 1, further comprising filling the at least one first chamber and the at least one second chamber with a liquid filling.

5. The method according to claim 1, further comprising filling the at least one first chamber and the at least one second chamber with different fillings.

6. The method according to claim 1, wherein the cover comprises a thin foil.

7. The method according to claim 1, wherein the first mould component and the at least one second mould component of the hollow mould comprise two identical mould components.

8. The method according to claim 1, wherein the hollow body of the chocolate material comprises a substantially spherical hollow body having two chambers having substantially the same size.

9. The method according to claim 1, further comprising filling the at least one first chamber and the at least one second chamber with different fillings in order to produce a two chamber chocolate sweet.

10. The method according to claim 5, wherein the different fillings react with each other as they mix when the partition wall is broken.

11. The method according to claim 6, wherein the thin foil used as the cover comprises a plastic foil.

12. The method according to claim 10, wherein the different fillings in the at least one first chamber and the at least one second chamber release a gas when the partition wall is broken, flow together and react.

13. A chocolate produced by the method according to claim 1.

14. A chocolate produced by the method according to claim 5.

15. A chocolate produced by the method according to claim 10.

* * * * *